United States Patent
Kim

(10) Patent No.: US 11,078,564 B2
(45) Date of Patent: Aug. 3, 2021

(54) HOT-DIP GALVANIZED STEEL SHEET WITH EXCELLENT SURFACE QUALITY AND RESISTANCE TO LOW TEMPERATURE BRITTLE FRACTURE

(71) Applicant: POSCO, Pohang-si (KR)

(72) Inventor: Sang-Heon Kim, Gwangyang-si (KR)

(73) Assignee: POSCO, Pohang-si (KR)

( * ) Notice: Subject to any disclaimer, the term of this patent is extended or adjusted under 35 U.S.C. 154(b) by 475 days.

(21) Appl. No.: 16/062,945

(22) PCT Filed: Dec. 22, 2016

(86) PCT No.: PCT/KR2016/015075
§ 371 (c)(1),
(2) Date: Jun. 15, 2018

(87) PCT Pub. No.: WO2017/111484
PCT Pub. Date: Jun. 29, 2017

(65) Prior Publication Data
US 2018/0363118 A1    Dec. 20, 2018

(30) Foreign Application Priority Data
Dec. 22, 2015   (KR) ........................ 10-2015-0184111

(51) Int. Cl.
*B32B 15/01*        (2006.01)
*C23C 2/06*         (2006.01)
(Continued)

(52) U.S. Cl.
CPC .............. *C23C 2/06* (2013.01); *B32B 15/013* (2013.01); *C22C 18/00* (2013.01); *C22C 18/04* (2013.01);
(Continued)

(58) Field of Classification Search
None
See application file for complete search history.

(56) References Cited

U.S. PATENT DOCUMENTS

| 4,812,371 A | 3/1989 | Shindou et al. |
| 2008/0206592 A1 | 8/2008 | Kim et al. |

(Continued)

FOREIGN PATENT DOCUMENTS

| CN | 101115858 | 1/2008 |
| EP | 2666882 | 11/2013 |

(Continued)

OTHER PUBLICATIONS

Chinese Office Action—Chinese Application No. 201680075385.5 dated Aug. 6, 2019, citing CN 101115858 and KR 20150073316.
(Continued)

*Primary Examiner* — Daniel J. Schleis
(74) *Attorney, Agent, or Firm* — Cantor Colburn LLP

(57) ABSTRACT

Provided is a hot-dip galvanized steel sheet including a base steel sheet and a hot-dip zinc-based plating layer formed on the base steel sheet. The hot-dip zinc-based plating layer includes a Zn single phase having an average equivalent circular diameter of 120 μm or less as a microstructure. In the Zn single phase, a Zn single phase having a crystal structure of which a {0001} plane is parallel to a surface of the steel sheet, is provided in an area fraction of 70% or less.

5 Claims, 2 Drawing Sheets (a)

(b)

(51) Int. Cl.
- *C23C 2/40* (2006.01)
- *C22C 18/04* (2006.01)
- *C22C 38/00* (2006.01)
- *C22C 18/00* (2006.01)
- *C23C 2/26* (2006.01)
- *C23C 2/02* (2006.01)
- *C21D 9/46* (2006.01)

(52) U.S. Cl.
CPC ............... *C22C 38/00* (2013.01); *C23C 2/02* (2013.01); *C23C 2/26* (2013.01); *C23C 2/40* (2013.01); *C21D 9/46* (2013.01); *Y10T 428/12799* (2015.01)

(56) References Cited

U.S. PATENT DOCUMENTS

2012/0152411 A1    6/2012  Morimoto et al.
2014/0017516 A1*   1/2014  Lee ..................... C23C 2/06
                                                    428/659

FOREIGN PATENT DOCUMENTS

| JP | 56112452 | 9/1981 | |
|----|----------|--------|---|
| JP | 63111163 | 5/1988 | |
| JP | 06256924 | 9/1994 | |
| JP | 07173597 | 7/1995 | |
| JP | 2002146502 | 5/2002 | |
| JP | 2002275611 | 9/2002 | |
| JP | 2002371342 | * 12/2002 | |
| JP | 2008525641 | 7/2008 | |
| JP | 2014506626 | 3/2014 | |
| KR | 20000045528 | 7/2000 | |
| KR | 20010057547 | 7/2001 | |
| KR | 20010061451 | 7/2001 | |
| KR | 100742832 | 7/2007 | |
| KR | 20110075612 | 7/2011 | |
| KR | 20120049295 | 5/2012 | |
| KR | 20130017414 | 2/2013 | |
| KR | 20150073316 | 7/2015 | |
| WO | 2006070995 | 7/2006 | |

OTHER PUBLICATIONS

Japanese Office Action—Japanese Application No. 2018-532215 dated Jul. 2, 2019, citing JP 2002-371342, JP 06-256924, JP 2008-525641, US 2008-0206592, JP 2014-506626, EP 02666882, KR 10-2011-0075612, KR 10-2015-0073316, JP 63-111163, JP 2002-146502, JP 07-173597 and JP 56-112452.

International Search Report—PCT/KR2016/015075 dated Mar. 3, 2017.

European Search Report—European Application No. 16879351.1, dated Nov. 29, 2018, citing WO 2006/070995, KR 2015 0073316, US 4 812 371 and EP 2 666 882.

* cited by examiner (a)

(b)

HOT-DIP GALVANIZED STEEL SHEET WITH EXCELLENT SURFACE QUALITY AND RESISTANCE TO LOW TEMPERATURE BRITTLE FRACTURE

TECHNICAL FIELD

The present disclosure relates to a hot-dip galvanized steel sheet having good surface qualities and resistance to low temperature brittle fracturing.

BACKGROUND ART

The use of hot-dip galvanized steel sheets has recently been expanded to home and automotive applications owing to simple manufacturing processes and inexpensive prices compared to electrogalvanized steel sheets.

Unlike electrogalvanized steel sheets, however, general hot-dip galvanized steel sheets may have a galling phenomenon in which a plating layer is partially attached to a die and separated during a forming process or may have poor surface qualities because of surface defects such as orange peel formed during a painting process. The reason for this is as follows.

In general, hot-dip galvanized steel sheets may easily have a characteristic plating structure called a spangle or flower pattern. The generation of such spangles is a characteristic of zinc solidification. That is, when zinc solidifies, dendrites shaped like a tree branch grow from solidification nuclei as a framework of a plating structure, and then solidification of a plating layer finishes as molten zinc pools remaining between the dendrites finally solidify. In general, when dendrites grow, the dendrites solidify while consuming surrounding molten zinc, and thus a plating layer is uneven because of convex portions formed in the positions of the dendrites and concave portions formed in the positions of pools, thereby resulting in poor surface qualities.

Korean Patent No. 0742832 discloses a technique for improving surface qualities, particularly, the image clarity and galling resistance of a hot-dip galvanized steel sheet by spraying droplets of a phosphate solution onto a surface of a molten zinc plating layer to provide the droplets as solidification nuclei when the molten zinc plating layer solidifies and to adjust the average grain size of zinc grains to be 0.1 mm or less. However, a hot-dip galvanized steel sheet manufactured using the technique has an excessively high content of zinc grains having a crystal structure of which a {0001} plane is parallel to the surface of the steel sheet, and thus low temperature brittle fracturing may occur.

DISCLOSURE

Technical Problem

An aspect of the present disclosure is to provide a hot-dip galvanized steel sheet having good surface qualities and resistance to low temperature brittle fracturing.

Technical Solution

According to an aspect of the present disclosure, a hot-dip galvanized steel sheet includes a base steel sheet and a hot-dip zinc-based plating layer formed on the base steel sheet. The hot-dip zinc-based plating layer includes a Zn single phase having an average equivalent circular diameter of 20 μm to 100 μm as a microstructure, and in the Zn single phase, a Zn single phase having a crystal structure of which a {0001} plane is parallel to a steel surface, is provided in an area fraction of 70% or less.

Advantageous Effects

According to one of a variety of effects of the present disclosure, an embodiment of the present disclosure provides a hot-dip galvanized steel sheet having good appearance and high resistance to low temperature brittle fracturing.

BEST MODE

Figure 1:
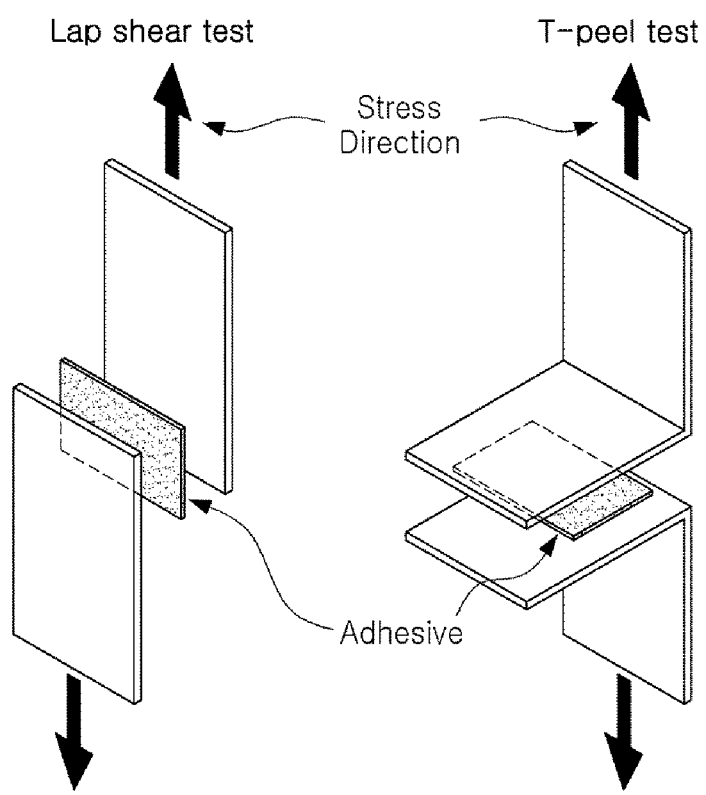
FIG. 1 is a view illustrating a T-peel test and a lab shear test for comparison.

The inventor has conducted various studies to provide a hot-dip galvanized steel sheet having good surface qualities and low temperature ductile fracture characteristics as well, and found that if the components of a zinc-based plating layer and the content ranges of the components are properly adjusted together with manufacturing conditions to optimize the average grain size and orientation of zinc grains, a hot-dip galvanized steel sheet having intended properties can be obtained. Based thereon, the inventor has invented the present invention.

Hereinafter, a hot-dip galvanized steel sheet having good surface qualities and high resistance to low temperature brittle fracturing will be described in detail according to an aspect of the present disclosure.

According to an aspect of the present disclosure, the hot-dip galvanized steel sheet includes a base steel sheet and a hot-dip zinc-based plating layer. In the present disclosure, the base steel sheet is not limited to a particular type. For example, a hot-rolled steel sheet or a cold-rolled steel sheet commonly used as a base steel sheet of a hot-dip galvanized steel sheet may be used. However, hot-rolled steel sheets may have a large amount of surface oxide scale that lowers plating adhesion and thus plating quality, and thus a hot-rolled steel sheet from which oxide scale has been previously removed using an acid solution may be used as the base steel sheet. In addition, the hot-dip zinc-based plating layer may be formed on one or each side of the base steel sheet.

The hot-dip zinc-based plating layer has a zinc (Zn) single phase as a microstructure, and the average equivalent circular diameter of the Zn single phase is 120 μm or less, preferably 100 μm or less. If the average equivalent circular diameter of the Zn single phase is greater than 120 μm, intended surface qualities, particularly image clarity and galling resistance may not be obtained. As the average equivalent circular diameter of the Zn single phase decreases, image clarity and galling resistance are more easily guaranteed, and thus the lower limit of the average equivalent circular diameter of the Zn single phase is not particularly limited. However, to adjust the average equivalent circular diameter to be 20 μm or less, excessively rapid cooling is required, and thus excessively large equipment is needed. In addition, additional effects are negligible when the average equivalent circular diameter is 20 μm or less.

Thus, the lower limit of the average equivalent circular diameter may be set to be 20 μm.

In the Zn single phase of the hot-dip zinc-based plating layer, a Zn single phase having a crystal structure of which a {0001} plane is parallel to a surface of the steel sheet may be provided in an area fraction of 70% or less, more preferably, in an area fraction of 65% or less.

According to results of research conducted by the inventor, as the size of a plating microstructure decreases, the {0001} plane of the plating microstructure has a more preferred orientation, and particularly, if the preferred orientation of the {0001} plane of the plating microstructure is 70% or greater, there is a risk of low temperature adhesive brittleness. The reason for this may be that if the {0001} plane of a plating microstructure has a strong preferred orientation, twining being a deformation mechanism of zinc is not easily caused by tensile force applied in a direction perpendicular to the plating layer. Thus, to guarantee resistance to low temperature brittle facture as intended in the present disclosure, it may be preferable that the area fraction of the Zn single phase having a crystal structure of which the {0001} plane is parallel to the surface of the steel sheet be adjusted to be 70% or less. As the area fraction decreases, resistance to low temperature brittle fracturing is more surely guaranteed, and thus the lower limit of the area fraction is not particularly limited.

The components of the hot-dip zinc-based plating layer and the content ranges of the components for guaranteeing the above-described microstructure will now be described in detail.

In an example, the hot-dip zinc-based plating layer may include Al: 0.15 wt % to 0.4 wt %, at least one of Mg, Ca, and Mn: 0.05 wt % to 0.2 wt % in total, and the balance of Zn and inevitable impurities.

Al: 0.15 wt % to 0.4 wt %

Al reacts with Fe and forms an Fe—Al-based alloy layer between the base steel sheet and the hot-dip zinc-based plating layer, thereby improving adhesion of the hot-dip zinc-based plating layer. In the present disclosure, to obtain this effect, it may be preferable that the content of Al be within the range of 0.15 wt % or greater. However, if the content of Al is greater than 0.4 wt %, defects such dross may increase, and a Zn—Al binary eutectic structure may be formed in the hot-dip zinc-based plating layer to result in poor phosphatability.

At Least One of Mg, Ca, and Mn: 0.05 wt % to 0.2 wt % in Total

Mg, Ca, and Mn suppress the growth of dendrites when the plating layer solidifies, thereby reducing the average equivalent circular diameter of the Zn single phase. To obtain this effect in the present disclosure, the total content of at least one of Mg, Ca, and Mn may be 0.05 wt % or greater. However, if the content of at least one of Mg, Ca, and Mn is excessively high, these elements may exist in the form of dross on the surface of the plating layer, and the surface qualities of the plated steel sheet may deteriorate. To prevent this, it may be preferable that the total content of at least one of Mg, Ca, and Mn be 0.2 wt % or less.

In addition, the plating layer may include Zn and inevitable impurities as a remainder. However, impurities of raw materials or manufacturing environments may be inevitably included in the hot-dip zinc-based plating layer, and such impurities may not be removed from the hot-dip zinc-based plating layer. Such impurities are well-known to those of ordinary skill in the art, and thus descriptions thereof will not be given in the present disclosure. In addition, the addition of effective elements other than the above-described elements is not excluded. For example, the following element may be added to maximize effects intended in the present disclosure.

Be: 0.0001 wt % to 0.002 wt %

Be improves the flatness of the plating layer, and Be existing in a surface region of the plating layer improves the appearance of the plating layer. To obtain these effects in the present disclosure, preferably the content of Be may be within the range of 0.0001 wt % or greater. However, if the content of Be is excessively high, plating failure may occur because of poor wettability of the base steel sheet with the plating layer. Thus, the upper limit of the content of Be is set to be 0.002 wt %.

As described above, the hot-dip galvanized steel sheet of the present disclosure may be manufactured by various methods without limitations. In an embodiment, however, the hot-dip galvanized steel sheet may be manufactured by preparing a steel sheet having an activated surface as a base steel sheet, forming a zinc-based plating layer on the base steel sheet, and cooling the plating layer by a cooling method in which a phosphate solution is sprayed just after solidification nuclei of the plating layer are formed on an interface between the plating layer and the base steel sheet. This will now be described in more detail.

Preferred orientation of the {0001} plane of the plating layer is determined by the positions of solidification nuclei of the plating layer and the cooling rate of the plating layer. If solidification nuclei are intentionally formed on a surface of the plating layer by spraying a phosphate solution when the plating layer solidifies, the size of the microstructure of the plating layer decreases, and preferred orientation of the {0001} plane of the plating layer increases. Unlike this, in a usual case, solidification nuclei are first formed on the interface between the base steel sheet and the plating layer having a relatively low temperature, and the preferred orientation of the {0001} plane is lowered by the solidification nuclei formed as described above on the interface between the base steel sheet and the plating layer. Therefore, if a phosphate solution is sprayed just after solidification nuclei are formed on the interface between the plating layer and the base steel sheet, the size of the microstructure of the plating layer may be decreased without markedly increasing the preferred orientation of the {0001} plane.

The temperature at which solidification nuclei are formed on the interface between the plating layer and the base steel sheet is 419.5° C. in the case of pure zinc, and tends to decrease as the content of Al in a plating bath increases. Therefore, the temperature just after solidification nuclei are formed on the interface between the plating layer and the base steel sheet may not be specified. However, the temperature may be within the range of 418° C. to 419.5° C. Here, the moment just after solidification nuclei are formed on the interface between the plating layer and the base steel sheet may be a time point after 1 second from the time at which surface edges of the steel sheet start to solidify after the steel sheet passes through an air wiping apparatus in a general continuous galvanizing line (CGL).

As described above, in the present disclosure, since a phosphate solution is sprayed after solidification nuclei are formed, the formation of solidification nuclei is not facilitated by the sprayed phosphate solution, but only the effect of suppressing the growth of the microstructure of the plating layer is obtained. That is, if a general steel sheet is used as the base steel sheet to be plated, the effect of refinement of the microstructure of the plating layer is not sufficiently obtained. Therefore, in the present disclosure, a steel sheet having an activated surface is used as the base steel sheet to facilitate the growth of solidification nuclei, and the formation of solidification nuclei may be facilitated as follows.

First, before plating, fine concave-convex portions may be formed on the surface of the base steel sheet to facilitate heterogeneous nucleation. The effect of concave-convex portions, formed on a surface of a material to be plated, on the formation of solidification nuclei have been analyzed, and it has found that among surface concave-convex portions having various wavelengths, surface concave-convex portions having a wavelength of 0.1 μm to 1 μm and a wave height of 0.1 μm to 0.5 μm facilitate the formation of solidification nuclei and thus increase the density of solidification nuclei. Here, each of the wavelength and the wave height is an average value, and if any one of the wavelength and the wave height of concave-convex portions is outside the above-mentioned range, the concave-convex portions have no effect on the formation of solidification nuclei. Such fine surface concave-convex portions may be formed by polishing the surface of the base steel sheet using sandpaper after a degreasing process before a plating process.

Secondly, before plating, a foreign substance may be uniformly distributed on the surface of the base steel sheet. For example, when the base steel sheet is degreased to remove rolling oil before an annealing process, the rolling oil may not be completely removed, but some of the rolling oil may be left. In this case, carbon remaining on the surface of the base steel sheet functions as solidification nuclei. In this case, the amount of the rolling oil remaining on the surface of the base steel sheet may range from 10 mg/m$^2$ to 1 g/m$^2$.

MODE FOR INVENTION

Hereinafter, the present disclosure will be described more specifically through examples. However, the following examples should be considered in a descriptive sense only and not for purpose of limitation. The scope of the present invention is defined by the appended claims, and modifications and variations reasonably made therefrom.

Example 1

Base steel sheets having a thickness of 0.8 mm were dipped into acetone and ultrasonic cleaned to remove foreign substances such as rolling oil from the surfaces of the base steel sheets. Thereafter, a 750° C. reducing atmosphere heat treatment commonly used to guarantee mechanical characteristics of steel sheets in the hot-dipping plating field was performed on the base steel sheets. Next, while moving the base steel sheets at a speed of 80 m/min, the base steel sheets were dipped into a hot-dip galvanizing bath containing Al: 0.30 wt %, Mg: 0.05 wt %, Ca: 0.05 wt %, Mn: 0.05 wt %, and Be: 0.002 wt %. Thereafter, the base steel sheets were wiped with air to adjust by sum of the plating amount of zinc on each side of the base steel sheets to be 140 g/m$^2$, and were then cooled to solidify plating layers. At this time, droplets of an aqueous solution of 1.5 wt % ammonium hydrogen phosphate ($(NH_4)_2HPO_4$) was sprayed by a charge spray method (spray amount of droplets: 70 g/m$^2$) onto all samples with different conditions: whether to leave rolling oil, and phosphate spray timing, as shown in Table 1 below. In the "remaining rolling oil" column of table 1 below, "○" indicates the case in which rolling oil was intentionally left in an amount of 300 mg/m$^2$, and "X" indicates the case in which rolling oil remained on a surface of a base steel sheet in an amount of less than 10 mg/m$^2$. Furthermore, in the "phosphate spray start timing" column of Table 1 below, "just before solidification" refers to the moment at which surface edges of a steel sheet started to solidify after passing through an air wiping apparatus, "just after solidification" refers to the moment 1 second after surface edges of a steel sheet started to solidify after passing through the air wiping apparatus, and "after solidification" refers to the moment at which the surface temperature of a steel sheet reached 415° C. after passing through the air wiping apparatus.

Thereafter, plated steel sheets manufactured as described above were subjected to a cup forming process to evaluate galling, and results thereof are shown in Table 1 below. Galling resistance was evaluated based on the number of continuous forming until which a surface rubbed with a die had good quality without defects, that is, less than 200 times: X, 200 times to less than 400 times: Δ, 400 times to less than 500 times: ○, and 500 times or greater: ⊚.

Thereafter, the plated steel sheets were painted to evaluate image clarity, and results thereof are shown in Table 1 below. Specifically, the same painting layer having a thickness of 85 μm was formed on each of the plated steel sheets. Then, a LW value was measured 10 times using Wavescan by BYK Gardner, and the average of measured LW values was calculated.

Thereafter, low temperature brittle fracturing characteristics of the plated steel sheets were measured. Specifically, a T-peel test was performed to evaluate whether a ductile fracture mode was observed, and results thereof are shown in Table 1 below. As illustrated in FIG. 1, c-axis tensile stress could be simulated in the T-peel test unlike in a general lab shear test. The area of adhesive was 12.5 mm×12.5 mm, and after a sample was maintained at −40° C. for 20 minutes, stress was applied to the sample at a rate of 450 mm/min. When the ductile fracture mode was observed at −40° C., it was evaluated as "⊚," and when a brittle fracture mode was observed at −40° C., it was evaluated as "X."

TABLE 1

| No. | Remaining rolling oil | Phosphate spray start timing | Average equivalent circular diameter of Zn single phase (μm) | Preferred orientation of {0001} plane (%) | Galling resistance | Image clarity | Low temperature brittle fracturing characteristics | Note |
|---|---|---|---|---|---|---|---|---|
| 1 | ○ | just before solidification | 50 | 90 | ⊚ | 3 | X | *CS1-1 |
| 2 | ○ | just after solidification | 80 | 50 | ⊚ | 4 | ⊚ | **IS1-1 |
| 3 | ○ | after solidification | 130 | 60 | X | 7 | ⊚ | CS1-2 |

TABLE 1-continued

| No. | Remaining rolling oil | Phosphate spray start timing | Average equivalent circular diameter of Zn single phase (μm) | Preferred orientation of {0001} plane (%) | Galling resistance | Image clarity | Low temperature brittle fracturing characteristics | Note |
|---|---|---|---|---|---|---|---|---|
| 4 | X | just before solidification | 50 | 90 | ⊚ | 4 | X | CS1-3 |
| 5 | X | just after solidification | 150 | 60 | X | 8 | ⊚ | CS1-4 |
| 6 | X | after solidification | 150 | 60 | X | 8 | ⊚ | CS1-5 |

*CS: Comparative Sample,
**IS: Inventive Sample

Referring to Table 1, In the case of Inventive Sample 1-1, a spangle size was 80 μm, and preferred orientation of the {0001} plane was 50%, resulting in good galling resistance, image clarity, and low temperature brittle fracturing characteristics. Reasons for this may be as follows. Solidification started on the interface of the plating layer because carbon remaining on the interface functioned as solidification nuclei, and since the phosphate solution was sprayed when Zn dendrites grew, the plating layer could have a small spangle size and random orientation.

Unlike this, Comparative Sample 1-1, on which the phosphate solution was sprayed just before solidification, had a very small spangle size on the level of 50 μm, but had poor resistance to low temperature brittle fracturing because the {0001} plane of Zn was developed. The reason for this may be that droplets of the phosphate solution attached to the steel sheet functioned as solidification nuclei and solidification rapidly occurred.

Comparative Sample 1-2, onto which the phosphate solution was sprayed when the temperature of the steel sheet was 415° C., had a spangle size of 130 μm and poor image clarity after painting because of a low cooling rate even though remaining surface carbon functioned as solidification nuclei.

Comparative Samples 1-3, 1-4, and 1-5 were plated after surface carbon was completely removed, and Comparative Sample 1-3 had properties similar to those of Comparative Sample 1-1. Therefore, it may be understood that if a phosphate solution is sprayed before a plating layer starts to solidify, since the phosphate solution functions as solidification nuclei, remaining surface carbon has no effect.

Comparative Sample 1-4 had a spangle size of 150 μm greater than that of Inventive Sample 1-1, and thus had poor galling resistance and poor image clarity after painting. That is, when there was no surface carbon, the spangle size was great because of a low density of solidification nuclei on the interface between the plating layer and the base steel sheet.

Comparative Sample 1-5, onto which a solution was sprayed when the temperature of the steel sheet is 415° C., had poor galling resistance and poor image clarity after painting. When Comparative Sample 1-5 is compared with Comparative Sample 1-2, although phosphate spray conditions were the same, the spangle size of Comparative Sample 1-2 was 130 μm less than the spangle size of 150 μm of Comparative Sample 1-5. The reason for this may be that carbon remaining on the surface of the steel sheet functioned as solidification nuclei in Comparative Sample 1-2, and thus Comparative Sample 1-2 had a solidification nuclei density greater than that of Comparative Sample 1-5 and thus a relatively smaller spangle size.

As described with reference to Table 1, a zinc plating layer having a spangle size of 120 μm or less and preferred orientation of the {0001} plane within the range of 70% or less as proposed in the present disclosure may be obtained only when carbon remains on the surface of a steel sheet before plating and a phosphate solution is sprayed after solidification starts.

Figure 2:
FIG. 2 is (a) an image illustrating a surface of Inventive Sample 1 after evaluating low temperature brittle fracturing characteristics, and (b) an image illustrating a surface of Comparative Sample 1 after evaluating low temperature brittle fracturing characteristics.
Figure 2:
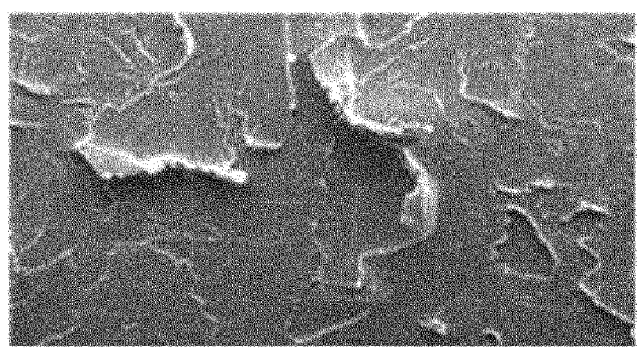

FIG. 2(A) is an image illustrating a surface of Inventive Sample 1-1 after evaluating low temperature brittle fracturing characteristics, and FIG. 2(B) is an image illustrating a surface of Comparative Sample 1-1 after evaluating low temperature brittle fracturing characteristics. Referring to FIG. 2, it may be visually confirmed that Inventive Sample 1-1 had a ductile fracture, and Comparative Sample 1-1 had a brittle fracture.

Example 2

Base steel sheets having a thickness of 0.8 mm were dipped into acetone and ultrasonic cleaned to remove foreign substances such as rolling oil. At that time, rolling oil was not completely removed but left on the surfaces of the base steel sheets in an amount of 300 mg/m². Thereafter, a 750° C. reducing atmosphere heat treatment commonly used to guarantee mechanical characteristics of steel sheets in the hot-dipping plating field was performed on the base steel sheets. Thereafter, at a moving rate of 80 m/min, the base steel sheets were dipped into hot-dip galvanizing baths having compositions shown in Table 2 below and were air wiped to adjust by sum of the amount of zinc to be 140 g/m² on each side of the base steel sheets. Then, the steel sheets were cooled to solidify plating layers. Droplets of an aqueous solution of ammonium hydrogen phosphate ((NH$_4$)$_2$HPO$_4$) were sprayed onto all samples by a charge spray method for cooling the samples. At that time, the spray of the droplets started 1 second after surface edges of the steel sheets started to solidify after passing through an air wiping apparatus. The concentration of the aqueous solution was 1.5 wt %, and the spray rate of the droplets was 70 g/m².

Thereafter, galling, image clarity after paining, and low temperature brittle fracturing characteristics were evaluated in the same manner as in Example 1, and results thereof are shown in Table 3 below.

TABLE 2

| Plating | Composition of plating bath (wt %) | | | | |
|---|---|---|---|---|---|
| baths | Al | Mg | Ca | Mn | Be |
| Plating bath 1 | 0.2 | 0.05 | — | — | — |
| Plating bath 2 | 0.23 | 0.1 | — | — | — |
| Plating bath 3 | 0.32 | 0.2 | — | — | — |
| Plating bath 4 | 0.35 | — | 0.05 | — | — |
| Plating bath 5 | 0.35 | — | 0.2 | 0.05 | — |
| Plating bath 6 | 0.3 | — | — | 0.1 | — |
| Plating bath 7 | 0.35 | 0.1 | 0.03 | 0.6 | — |
| Plating bath 8 | 0.36 | 0.05 | — | — | 0.0001 |
| Plating bath 9 | 0.30 | 0.05 | 0.05 | 0.05 | 0.002 |
| Plating bath 10 | 0.30 | — | — | — | — |
| Plating bath 11 | 0.30 | 0.25 | — | — | — |
| Plating bath 12 | 0.35 | 0.1 | 0.1 | 0.1 | — |

TABLE 3

| No. | Plating baths | Average equivalent circular diameter of Zn single phase (μm) | Preferred orientation of {0001} plane (%) | Galling resistance | Image clarity | Low temperature brittle fracturing characteristics | Note |
|---|---|---|---|---|---|---|---|
| 1 | Plating bath 1 | 100 | 50 | ◎ | 4.5 | ◎ | *IS2-1 |
| 2 | Plating bath 2 | 50 | 60 | ◎ | 5.0 | ◎ | IS2-2 |
| 3 | Plating bath 3 | 50 | 65 | ◎ | 4 | ◎ | IS2-3 |
| 4 | Plating bath 4 | 80 | 60 | ◎ | 4 | ◎ | IS2-4 |
| 5 | Plating bath 5 | 50 | 40 | ◎ | 7 | ◎ | **CS2-1 |
| 6 | Plating bath 6 | 60 | 60 | ◎ | 4 | ◎ | IS2-5 |
| 7 | Plating bath 7 | 20 | 60 | ◎ | 9 | ◎ | CS2-2 |
| 8 | Plating bath 8 | 40 | 60 | ◎ | 3 | ◎ | IS2-6 |
| 9 | Plating bath 9 | 30 | 40 | ◎ | 2 | ◎ | IS2-7 |
| 10 | Plating bath 10 | 300 | 50 | Δ | 8 | ◎ | CS2-3 |
| 11 | Plating bath 11 | 200 | 60 | ◎ | 7 | ◎ | CS2-4 |
| 12 | Plating bath 12 | 80 | 60 | ◎ | 6 | ◎ | CS2-5 |

*IS: Inventive Sample,
**CS: Comparative Sample

Referring to Table 3, Inventive Samples 2-1 to 2-7 satisfying all conditions proposed in the present disclosure had good galling resistance, image clarity after painting, and low temperature brittle fracturing characteristics. In particular, Inventive Samples 2-6 and 2-7, prepared using plating baths not including beryllium (Be), had very good image clarity after painting.

However, in the case of Comparative Samples 2-1 and 2-2 having a total content of Ca and Mn within the range of greater than 0.2 wt %, preferred orientation of the {0001} plane was within the range proposed in the present disclosure, but image clarity after painting was poor. The reason for this may be that Ca and Mn existed in plating layers as dross and lowered image quality. In the case of Comparative Sample 2-3 to which Ca, Mn, and Be were not added, the size of spangles was large at about 300 μm, and thus image clarity and galling resistance were poor. In the case of Comparative Sample 2-4 having a high Mg content on the level of 0.25 wt %, image clarity was slightly poor because Mg included in the plating layer was oxidized during solidification and formed a stripe pattern so called a hairline defect on the surface of the plating layer. In the case of Comparative Sample 2-5 to which Mg, Ca, and Mn were added in a total amount of 0.3 wt %, dot-shaped dross defects were observed on the surface of the plating layer, and thus image clarity was poor after painting.

The invention claimed is:
1. A hot-dip galvanized steel sheet comprising:
   a base steel sheet; and a hot-dip zinc-based plating layer formed on a surface of the base steel sheet,
   wherein the base steel sheet includes: concave-convex portions formed on the surface thereof, and the concave-convex portions form a wave having a wavelength of 0.1 μm to 1 μm and a wave height of 0.1 μm to 0.5 μm, and
   wherein the hot-dip zinc-based plating layer includes a Zn single phase having an average equivalent circular diameter of 20 μm to 120 μm as a microstructure, and
   in the Zn single phase, a Zn single phase having a crystal structure of which a {0001} plane is parallel to the surface of the base steel sheet, is provided in an area fraction of 70% or less.
2. The hot-dip galvanized steel sheet of claim 1, wherein the average equivalent circular diameter is 20 μm to 100 μm.
3. The hot-dip galvanized steel sheet of claim 1, wherein the hot-dip zinc-based plating layer comprises, by wt %, Al:

0.15% to 0.4%, at least one of Mg, Ca, and Mn: 0.05% to 0.2% in total, and a balance of Zn and inevitable impurities.

4. The hot-dip galvanized steel sheet of claim 3, wherein the hot-dip zinc-based plating layer further comprises, by wt %, Be: 0.0001% to 0.002%.

5. The hot-dip galvanized steel sheet of claim 1, wherein the area fraction is 65% or less.

* * * * *